US005685340A

United States Patent [19]

Huang

[11] Patent Number: 5,685,340

[45] Date of Patent: Nov. 11, 1997

[54] METERING VALVE

[76] Inventor: Hsi-Hung Huang, No. 37, Lane 281, Hwa Cheng Road., Hsin Chuang, Taipei Hsien, Taiwan

[21] Appl. No.: 615,047

[22] Filed: Mar. 12, 1996

[51] Int. Cl.[6] .......... F16K 11/02

[52] U.S. Cl. .......... 137/625.49; 137/801; 251/335.3

[58] Field of Search .......... 137/625.49, 801; 251/335.3

[56] References Cited

U.S. PATENT DOCUMENTS

| | | | |
|---|---|---|---|
| 3,625,474 | 12/1971 | Juede | 251/335.3 X |
| 3,756,559 | 9/1973 | Boggs | 251/335.3 |
| 3,812,398 | 5/1974 | Kozel et al. | 251/331 |
| 5,165,652 | 11/1992 | Nicolaisen | 251/335.3 X |

*Primary Examiner*—Gerald A. Michalsky

*Attorney, Agent, or Firm*—Bacon & Thomas

[57] ABSTRACT

A improved metering valve includes a valve body, a retractable member, a control device, a feed duct and a return duct. The feed duct has a relay duct connected to a pumping system so that liquid may be directly pumped via the feed duct into the valve body. When the control device is inactive, a cock fitted into the valve body is urged by a spring to urge against an outlet of the valve body so that liquid cannot flow out therethrough. Instead, the liquid flows via a return hole into the return duct and back to the liquid reservoir. When the control device is actuated, a connecting portion thereof retracts so that the cock and a rod disposed thereon displace upwardly, so that the cock seals the return hole, allowing liquid into the feed duct and the valve body, through the through holes and out through the outlet for filling purposes. When the liquid has filled to a determined level, the control device stops and the spring will stretch so that the cock seals the outlet. Excessive liquid will flow via the return duct for recycling purposes.

10 Claims, 5 Drawing Sheets

METERING VALVE

BACKGROUND OF THE INVENTION (a) Field of the Invention

The present invention relates generally to a valve, and more particularly to an improved metering valve of a simple contruction for transporting liquids of relatively high concentration and viscosity.

(b) Description of the Prior Art

Filling processes of liquids like edible oil, soy sauce, milk, detergent, paint, etc., are common in various industries.

Flow rate is easy to control for pure liquids. However, for liquids of a high concentration or viscosity or containing solid particles, it is difficult to control the flow rate or amount in the filling process due to the arrangement of the valves and ducts. Such a problem has been a problem to manufactures.

Metering valves have been developed for controlling the flow of liquids. However, although these metering valves may achieve satisfactory results for filling pure liquids such as wine and soy sauce, for liquids of a high concentration or viscosity such as emulsified lotion or detergent which flow a relatively low speed, the ducts may become clogged, affecting the output.

Furthermore, conventional metering valves are complicated in construction and it is difficult to clean the valve parts. If a valve which has been used for one liquid is used for the filling process of another liquid, the residual of the previously used liquid may affect the purity of the latter.

In conventional metering valves, the valve is provided with an inlet at one side thereof. The liquid is pumped into the valve and then discharged through an outlet into a container. When the liquid has filled the container to a certain level, the valve will be sealed so that no liquid will flow out, and an electronic control circuit is utilized to stop the pumping system. An advantage of this arrangement is that, as the pumping system is on and off alternately, it may be overloaded so that the pump may be damaged, affecting the operation of the overall valve.

SUMMARY OF THE INVENTION

Accordingly, a primary object of the present invention is to provide an improved metering valve for transporting liquids of ordinary concentration and high viscosity so as to eliminate the drawbacks with the prior art.

Another object of the present invention is to provide an improved metering valve which is simple to construct and easy to clean and repair.

A further object of the present invention is to provide an improved metering valve which is provided with a return duct means for recycling excessive liquid.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
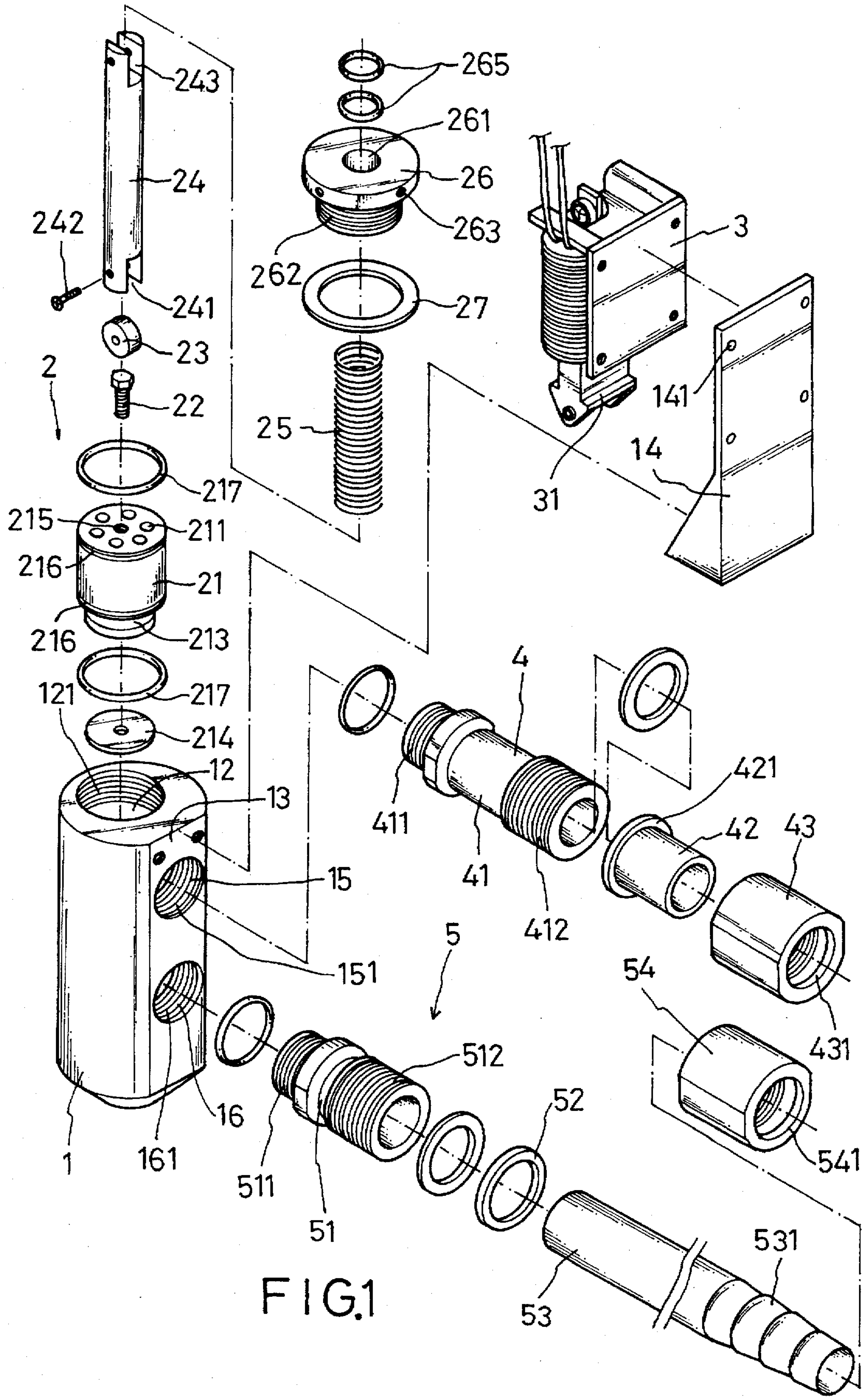
FIG. 1 is an elevational exploded view of a preferred embodiment of the metering valve of the invention.

With reference to the drawings, the metering valve according to the present invention essentially comprises a valve body 1, a retractable means 2, a control means 3, a feed duct means 4 and a return duct means 5.

Figure 2:
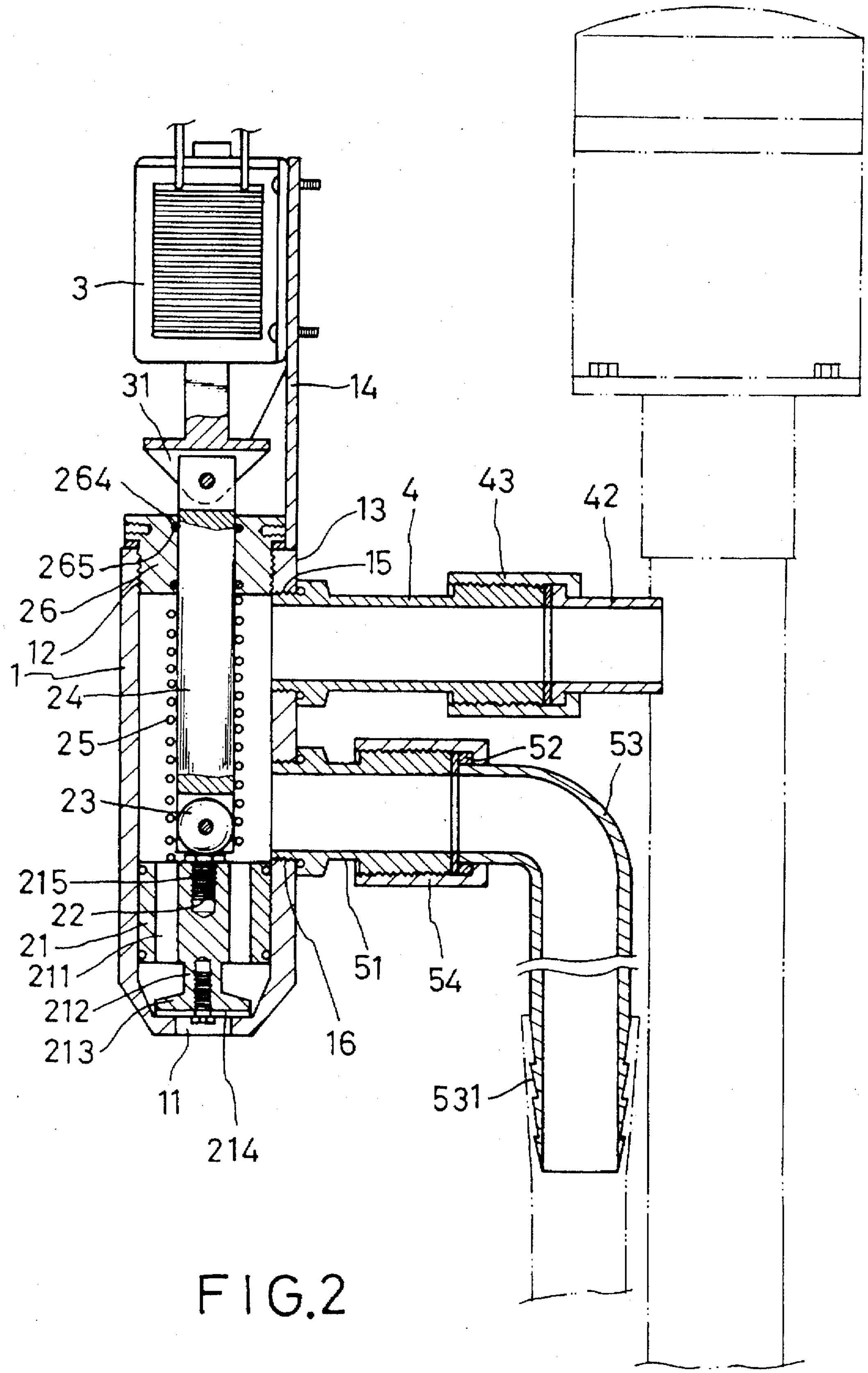
FIG. 2 is a sectional view of the metering valve of the invention.
Figure 3:
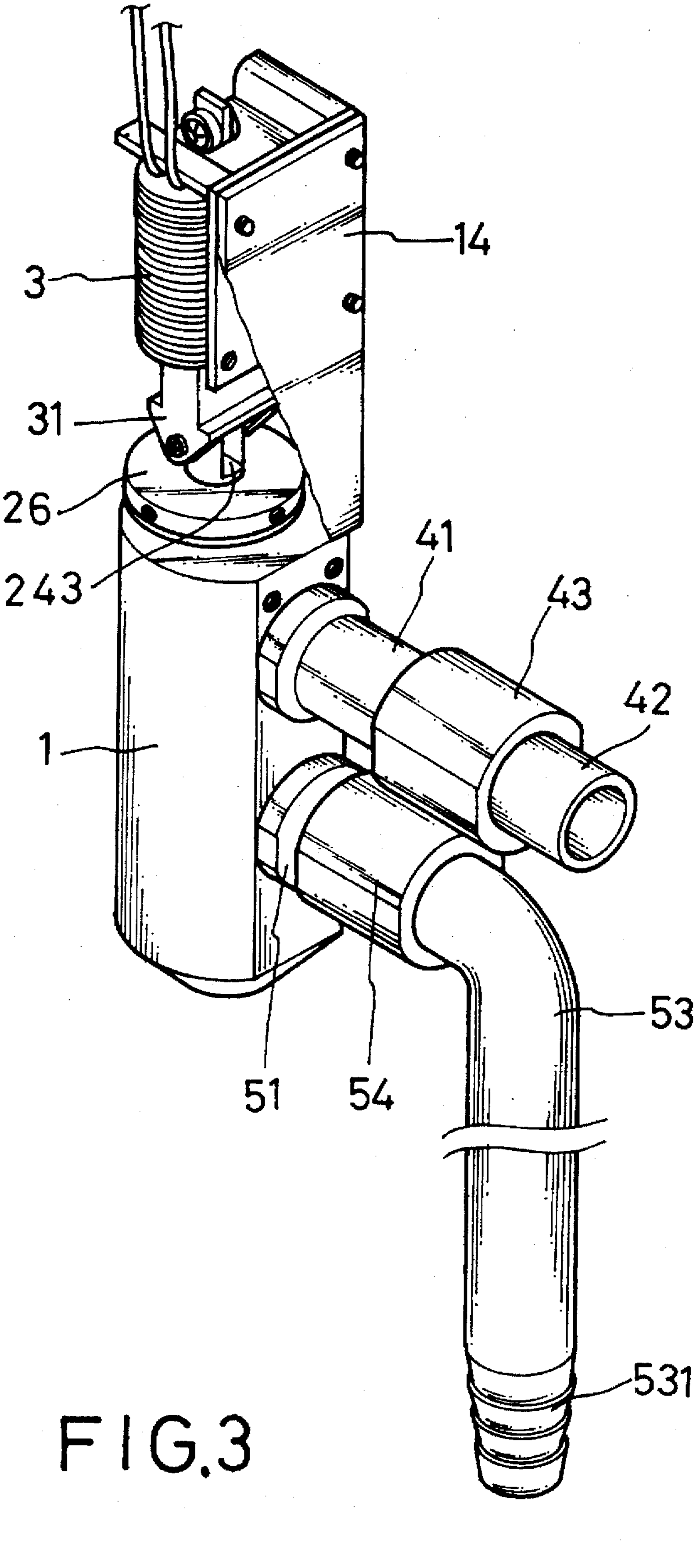
FIG. 3 is an elevational view of the metering valve in an assembled state.

With reference to FIGS. 1 to 3, the valve body 1 is a hollow tubular structure having an outlet 11 (see FIG. 2) of a relatively smaller diameter in a bottom side thereof and a longitudinally oriented valve hole 12 with multiple threads 121 in a top side thereof for receiving the retractable means 2 inserted thereinto. The valve body 1 is provided with a longitudinal milled surface 13 for connection with a mounting plate 14. The mounting plate 14 has a plurality of mounting holes for locking with the control means 3. A feed hole 15 having multiple threads 151 and a return hole 16 having multiple threads 161 are both formed on the milled surface 13 for connection with the feed duct means 4 and the return duct means 5 respectively.

The retractable means 2 consists of a cock 21 of a size matching the valve hole 12 of the valve body and has a plurality of longitudinally oriented through holes 211 distributed circumferentially in an upper side thereof for passage of a liquid. The cock 21 has a lower end integrally connected to a neck portion 212 and a disc plug 213 of a size slightly greater than that of the outlet 11 for closing the outlet 11. In order to ensure the sealing effect, the disc plug 213 has a lower end thereof connected to a soft pad 214 which serves as a buffer when the entire retractable means 2 is pressed downwardly into the valve hole 12 to seal the outlet 11. A threaded opening 215 is centrally disposed in the upper side of the cock 21 for threaded engagement with a screw rod 22, which is in turn welded with a pivot 23 located in a first notch 241 at a lower end of a rod 24 disposed above the pivot. A bolt 242 is passed through the notch 241 and the pivot 23 so that the pivot 23 may turn relative to the rod 24. The rod 24 further has a second notch 243 formed in an upper end thereof for connecting the control means 3. In assembly, a spring 25 is fitted onto the rod 24 and the second notch 243 of the rod 24 is passed through a central hole 261 of a cover 26 which has multiple threads at a lower end thereof for engaging the threads 121 of the valve hole 12, so that the retractable means 2 may be accommodated within the valve body 1. The cover 26 further has a circumferential rim with multiple holes 263. Rod-like devices may be inserted into the holes 263 to rotate and lock the cover 26 into the valve 12 of the valve body 1.

In order to ensure the tightness between the valve hole 12 and the cock 21, the cock 21 is provided with a plurality of circumferential grooves 216 for receiving matching O-rings 217 to prevent liquid from flowing out between the cock 21 and the valve hole 12. For the same reason, the hole 261 of the cover 26 is also provided with a plurality of circumferential grooves 264 for receiving a plurality of O-rings 265 to prevent liquid from overflowing through the hole 261. A washer 27 may be fitted onto the threads 262 of the cover 26 to prevent liquid from leaking between the cover 26 and the valve hole 12.

The control means 3 is secured to the mounting plate 141 and has a connecting portion 31 at a lower portion thereof for connecting with the second notch 243 of the rod 24. By means of the upward and downward displacement of the connecting portion 31, the cock 21 of the retractable means 2 may displace upwardly and downardly. In actual practice, a solenoid or a pneumatic or hydraulic cylinder may be used as the control means 3 to provide the retractable means 2 with the necessary travel.

The feed duct means 4 consists of a hollow feed tube 41 with a first threaded portion 411 at one end thereof and a second threaded portion 412 at the other end thereof. The first threaded portion 411 engages with the threads 151 of the inlet hole 15. The feed duct means 4 also consists of a relay duct 42 with a flange 421. The relay duct 42 is passed into a bushing 43 with multiple inner threads such that the flange 432 abuts a flange 431 of the relay bushing 43 and the second threaded portion 412 is locked with the inner threads of the bushing 43, thereby the relay duct 42 may be connected with the pumping system to guide the liquid into the valve body 1.

The return duct means 5 consists of a hollow return duct 51 having a first threaded portion 511 and a second threaded portion 512. The first threaded portion 511 is locked with the threads 161 of the return hole 16. A hollow ring 52 is welded to one end of a discharge duct 53, which is passed through a discharge bushing 54 having multiple inner threads so that the ring 52 abuts a flange 541 of the discharge bushing 54 and the second threaded portion 512 of the return duct 51 locks with the inner threads of the discharge bushing 54, thereby excessive liquid may flow via this path to return to the liquid reservoir. In order that the discharge duct 53 may be secured with other tubular components of different diameter, it is configured to have a series of steps 531 of diminishing diameter at one end portion thereof.

For the purpose of preventing leakage, the tubular components of the feed duct means 4 and the return duct means 5 may be provided with suitable O-rings or washers at their joints.

In actual use, with reference to FIG. 2, the relay duct 42 of the feed duct means 4 is connected to the pumping system (as shown by imaginary lines) so that liquid from the pumping system and the feed duct means 4 may enter the valve body 1 directly. When the control means 3 is not actuated, although the liquid passes through the through holes 211 of the cock 21, as the cock 21 is subjected to the action of the spring 25 so that the disc plug 213 and the pad 214 urge against the outlet 11, the liquid cannot flow out and will flow via the return hole 16 into the return duct means 5 and back into the liquid reservoir via the discharge duct 53 and associated ducts. When the control means 3 is actuated, the connecting portion 31 retracts so that the rod 24 and the cock 21 are brought to retract upwardly, with the cock 21 sealing the return hole 16 so that the liquid flows via the feed duct means 4 into the valve body 1 past the through holes 211 and the outlet 11 so that filling operation may proceed. When the liquid has filled to a set amount, the control means 3 will stop operating and the spring 25 will automatically stretch so that the disc plug 213 and the pad 214 seal the outlet 11 and the excessive liquid will be guided out of the return duct means 5, thereby achieving the object of recycling.

Figure 4:
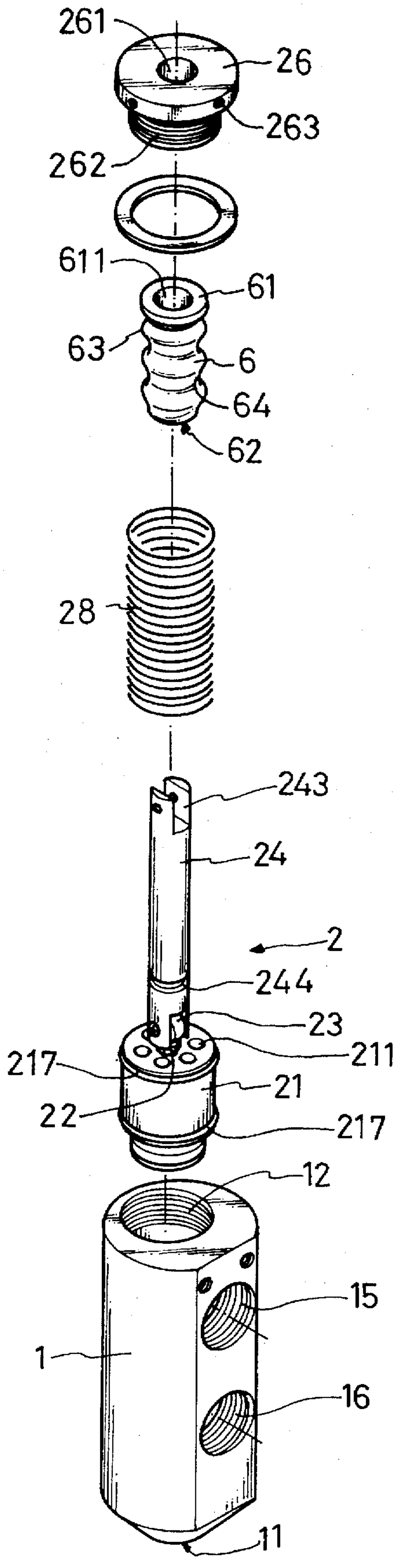
FIG. 4 is an elevational exploded view of a leakage-proof means for the metering valve of the invention.

Furthermore, with reference to FIG. 4, in order to prevent the O-rings 265 fitted in the hole 261 of the cover 26 from being worn due to prolonged rubbing against the rod 24 which displaces upwardly and downwardly in the hole 261, a leakage-proof means may be provided. In this embodiment, the rod 24 is fitted with a spring 28 having a diameter equivalent to that of the valve hole 12 such that the spring 28 passes through the valve hole 12 to locate between the cock 21 and the cover 26. Besides, the rod 24 is connected to a resilient plastic element 6 and has an annular groove 244 for engaging the plastic element 6.

The resilient plastic element 6 is a hollow resilient plastic structure of a wavy contour. It has a disc rim 61 at a top side thereof matching the internal diameter of the cover 26 so that they may engage each other and be positioned. The disc rim 61 has a central hole 611 for passage of the rod 24 therethrough. In addition, the resilient plastic element 6 has a bottom rim 62 for fitting into the annular groove 244 of the rod 24 such that the resilient element 6 may displace upwardly and downwardly with the rod 24. In order that the resilient plastic element 6 may have desirable resilience and leakage-proof effects, it is configured to have a plurality of annular ridges 63 and annular depressions 64, with the annular depressions 64 having an internal diameter matching the external diameter of the rod 24 so that it may envelop the rod 24 to prevent the liquid from leaking through the hole 261 of the cover when the liquid displaces upwardly along the rod 24. Preferably, the resilient plastic element 6 is made of high molecular polymer material.

Figure 5:
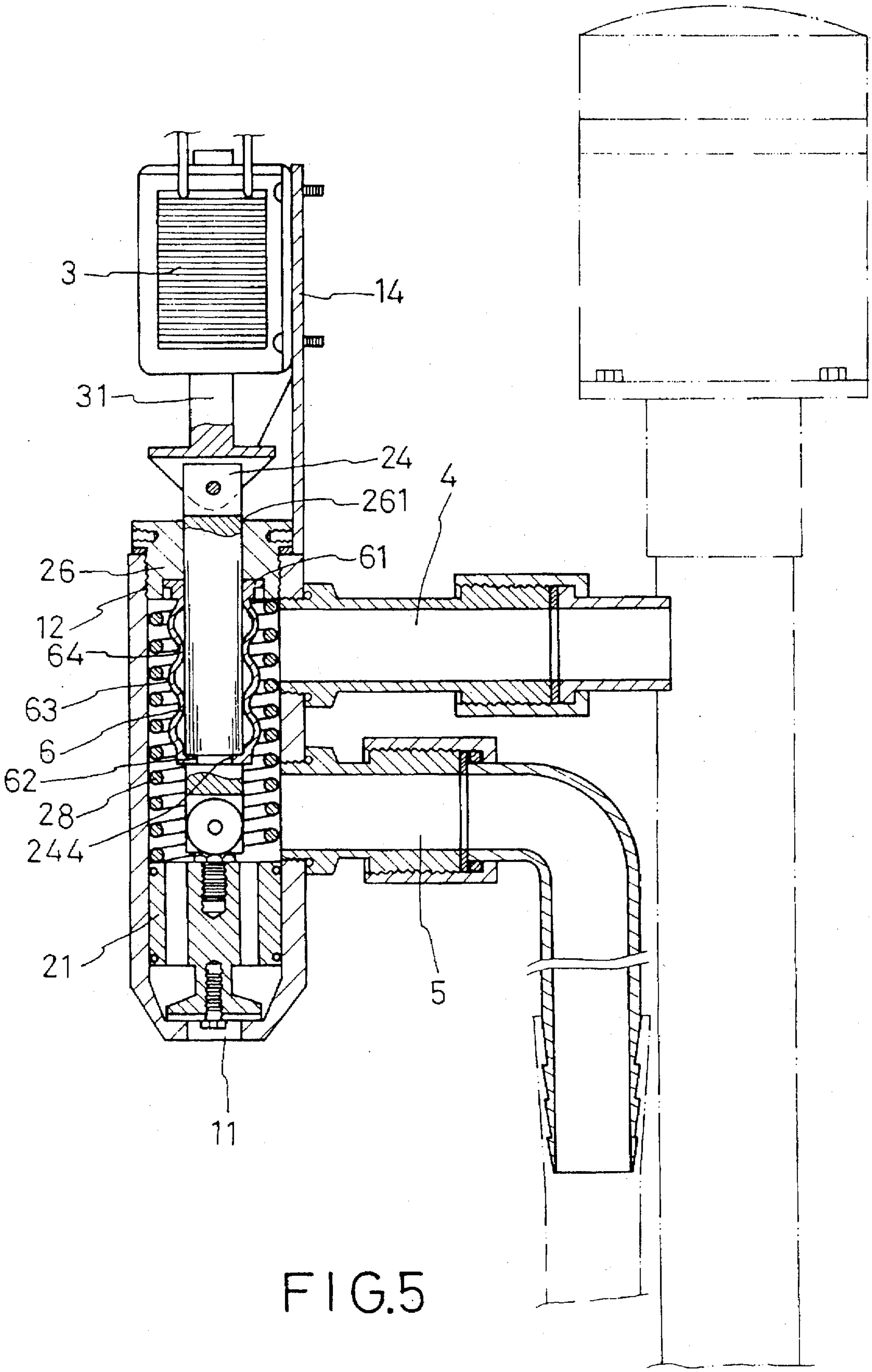
FIG. 5 is a sectional view of the leakage-proof means for the metering valve of the invention.

With reference to FIG. 5, when the control means 3 displaces upwardly, the cock 21 is brought to displace upwardly by the rod 24 to seal the return duct means 5. At this time, the resilient plastic element 6 is in a depressed state so that the liquid may flow via the feed duct means 4 into the valve body 1 past the through holes 211 of the cock 21 and out through the outlet 11. When the flow has reached a determined amount, the control means 3 extends downwardly, so that the disc plug 213 of the cock 21 seals the outlet 11. At this time, the resilient plastic element 6 is in a relaxed state, and the residual liquid in the valve body 1 is recycled via the return duct means 5.

The leakage-proof means as described above eliminates the use of O-rings 265 in the hole 261 of the cover 26. It is only necessary to provide a resilient plastic element 6 for fitting onto the rod 24 so that the resilient plastic element 6 may displace with the rod 24. And by means of the arrangement of the annular depressions 64 for enveloping the rod 24, leakage may be prevented.

In summary, the metering valve according to the present invention has the following advantages:

1. The metering valve of the invention is simple to construct and repair. Besides, it is essentially made of metal so that wear is reduced, prolonging its life.
2. For the control means of the invention, a general program or counter may be adopted for controlling the filling time, providing filling of liquid of high or low concentration at a determined amount.
3. The metering valve of the invention is easy to dismantle for cleaning purposes so that the valve may be used for another liquid.
4. The design of the return duct means helps prevent the pumping system from possible damage, and the residual liquid may be recycled, preventing waste of resources.
5. The metering valve of the invention may be used in conjunction with automatic machinery to enhance productivity.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved metering valve comprising:

a valve body of a hollow tubular structure having an outlet of a relatively smaller diameter in a bottom side thereof and a valve hole having multiple threads in a top side thereof for receiving a retractable means inserted therethrough, said valve body having a longitudinally oriented milled surface at a lateral side thereof, said valve body is connected to a mounting plate disposed on the top side thereof, said mounting plate is in turn secured with a control means, a feed hole having multiple threads and a return hole having multiple threads being formed in said milled surface for receiving a feed duct means and a return duct means respectively;

said retractable means, consisting of a cock of a size matching that of said valve hole and having a plurality of longitudinally oriented through holes circumferentially distributed on an upper side thereof for passage of a liquid, said cock having a lower end integrally connected to a neck portion and a disc plug of a size slightly larger than that of said outlet, said cock further having a centrally disposed threaded opening and a screw rod engaged within the opening, said screw rod is welded to a pivot which is fitted in a first notch formed in a lower end of a rod, a bolt being passed through said first notch and said pivot so that said pivot may turn, a spring being fitted around said rod which has a second notch passing through a hole of a cover so that said cover may be locked with said valve body; said control means being disposed on said mounting plate and having a connecting portion for fitting into said second notch of said rod to allow said retractable means to travel within said valve body, said feed duct means consisting of a plurality of tubular parts screwably connected to said feed hole of said valve body for passage of the liquid; and said return duct means consisting of a plurality of tubular parts screwably connected to said return hole of said valve body for passage of the liquid, said disc plug of said cock urging against said outlet by means of the action of said spring when said control means is inactive, so that the liquid from said valve body is discharged via said return duct means for recycling; said retractable means displaces upwardly when said control means is active, bringing said rod and said cock to simultaneously displace upwardly, with said cock sealing said return hole, so that the liquid flows via said feed duct means and said valve hole past said through holes of said cock and through said outlet until a determined amount is reached.

2. An improved metering valve as claimed in claim 1, wherein said disc plug of said cock is connected to a pad for serving as a buffer between said disc plug and said outlet when said spring extends and tightly sealing said outlet to prevent leakage.

3. An improved metering valve as claimed in claim 1, wherein said cover has a circumferential rim provided with a plurality of holes into which rod-like devices may be inserted to rotate and lock said cover into said valve hole.

4. An improved metering valve as claimed in claim 1, wherein said control means includes a solenoid for actuating said connecting portion thereof.

5. An improved metering valve as claimed in claim 1, wherein said feed duct means consists of a feed duct having a first threaded portion for engaging the threads of feed hole and a second threaded portion, a relay duct, and an internally threaded relay bushing for receiving said relay duct such that a flange at a rear end of said relay duct abuts a flange at a front end of said relay bushing, said relay bushing being screwably fitted onto said second threaded portion of said feed duct, thereby connecting said relay duct to a pumping system.

6. An improved metering valve as claimed in claim 1, wherein said return duct means consists of a return duct having a first threaded portion for engaging the threads of said return hole and a second threaded portion, a discharge duct, and an internally threaded discharge bushing for receiving said discharge duct inserted therethrough such that a couple of rings disposed between said return duct and said discharge duct abut a flange at a front end of said discharge bushing, said discharge bushing being screwably fitted onto said return duct, thereby excessive liquid in said discharge duct may be discharged for recycling.

7. An improved metering valve as claimed in claim 1, wherein said return duct means is connected to a discharge duct having one end thereof configured in a series of steps of diminishing diameter for connection to tubular parts of different diameters.

8. An improved metering valve as claimed in claim 1, wherein an O-ring is disposed between the tubular parts to prevent leakage from their joints.

9. The improved metering valve as claimed in claim 1, wherein the spring is of a diameter equivalent to that of said valve hole and is located between said cover and the cock, and wherein said rod has an annular groove at a lower portion thereof and is passed through a resilient plastic element which has a disc rim having a diameter matching the internal diameter of said cover at an upper end thereof for engaging therewith, said disc rim having a central hole for passage of said rod, said resilient plastic element having a bottom rim for engaging said annular groove of said rod and a plurality of annular ridges and annular depressions, said annular depressions having a diameter matching the external diameter of said rod so that said annular depressions may envelop said rod tightly to allow said resilient plastic element to displace upwardly and downwardly with said rod, thereby preventing liquid from leaking through the hole in the cover.

10. The improved metering valve as claimed in claim 9, wherein said resilient plastic element is made of high molecular polymer material.

* * * * *